United States Patent [19]
Oki et al.

[11] Patent Number: 6,123,341
[45] Date of Patent: Sep. 26, 2000

[54] CHUCK ASSEMBLY

[75] Inventors: Masaru Oki; Muneki Hiraoka, both of Yao, Japan

[73] Assignee: Teikoku Chuck Co., Ltd., Osaka, Japan

[21] Appl. No.: 09/034,367

[22] Filed: Mar. 4, 1998

[30] Foreign Application Priority Data

Mar. 6, 1997 [JP] Japan ................................. 9-051863

[51] Int. Cl.[7] ......................................................... B23B 5/22
[52] U.S. Cl. ........................ 279/4.12; 279/127; 279/133; 279/137
[58] Field of Search ................................ 279/4.1, 4.11, 279/4.12, 121, 127, 133, 137

[56] References Cited

U.S. PATENT DOCUMENTS

| | | | |
|---|---|---|---|
| 2,250,634 | 7/1941 | Groene | 279/4.11 |
| 2,742,296 | 4/1956 | Satterlee et al. | 279/137 |
| 3,814,449 | 6/1974 | Buck | 270/4.12 |
| 5,441,284 | 8/1995 | Mueller et al. | |
| 5,464,233 | 11/1995 | Hanai | 297/137 |
| 5,820,137 | 10/1998 | Patterson | 279/127 |

Primary Examiner—Andrea L. Pitts
Assistant Examiner—Monica Smith
Attorney, Agent, or Firm—Wenderoth, Lind & Ponack, L.L.P.

[57] ABSTRACT

A chuck assembly which can chuck thin and brittle workpieces that differ widely in size with high accuracy and reliability without warping them. The chuck assembly includes a tubular chuck body having three first cylinders and a plurality of second cylinders arranged along a circumference in a plane perpendicular to the axis of the chuck body at equal angular intervals. The cylinders have pistons adapted to protrude under oil pressure. The three first cylinders are also arranged at equal angular intervals. The chuck assembly further includes a pressure-biasing means for applying, independently of the oil pressure, pressure to the pistons of the first cylinders against a workpiece, so that the piston are less likely to be retracted by the reaction force from the workpiece. That is, this chuck assembly has a self-centering function.

4 Claims, 9 Drawing Sheets

PRIOR ART

FIG. 9

PRIOR ART

CHUCK ASSEMBLY

BACKGROUND OF THE INVENTION

This invention relates to a chuck assembly for chucking, during lathing, a workpiece, especially a workpiece which is thin and brittle and thus is likely to get warped when chucked.

A chuck assembly suitable for chucking a thin and brittle workpiece is disclosed in unexamined Japanese patent publication 7-256505.

Figure 8:
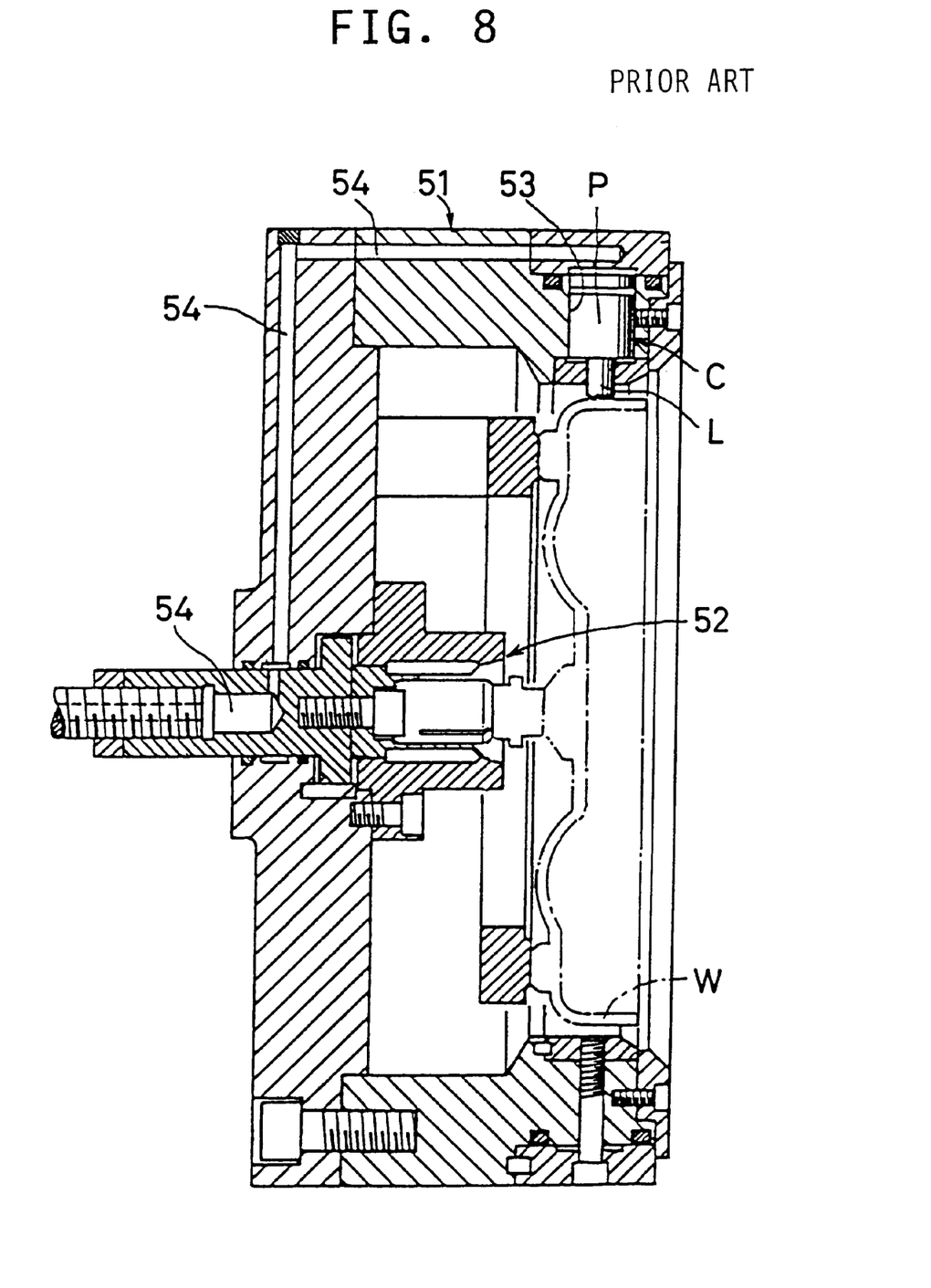
FIG. 8 is a vertical sectional view of a conventional chuck assembly.
Figure 9:
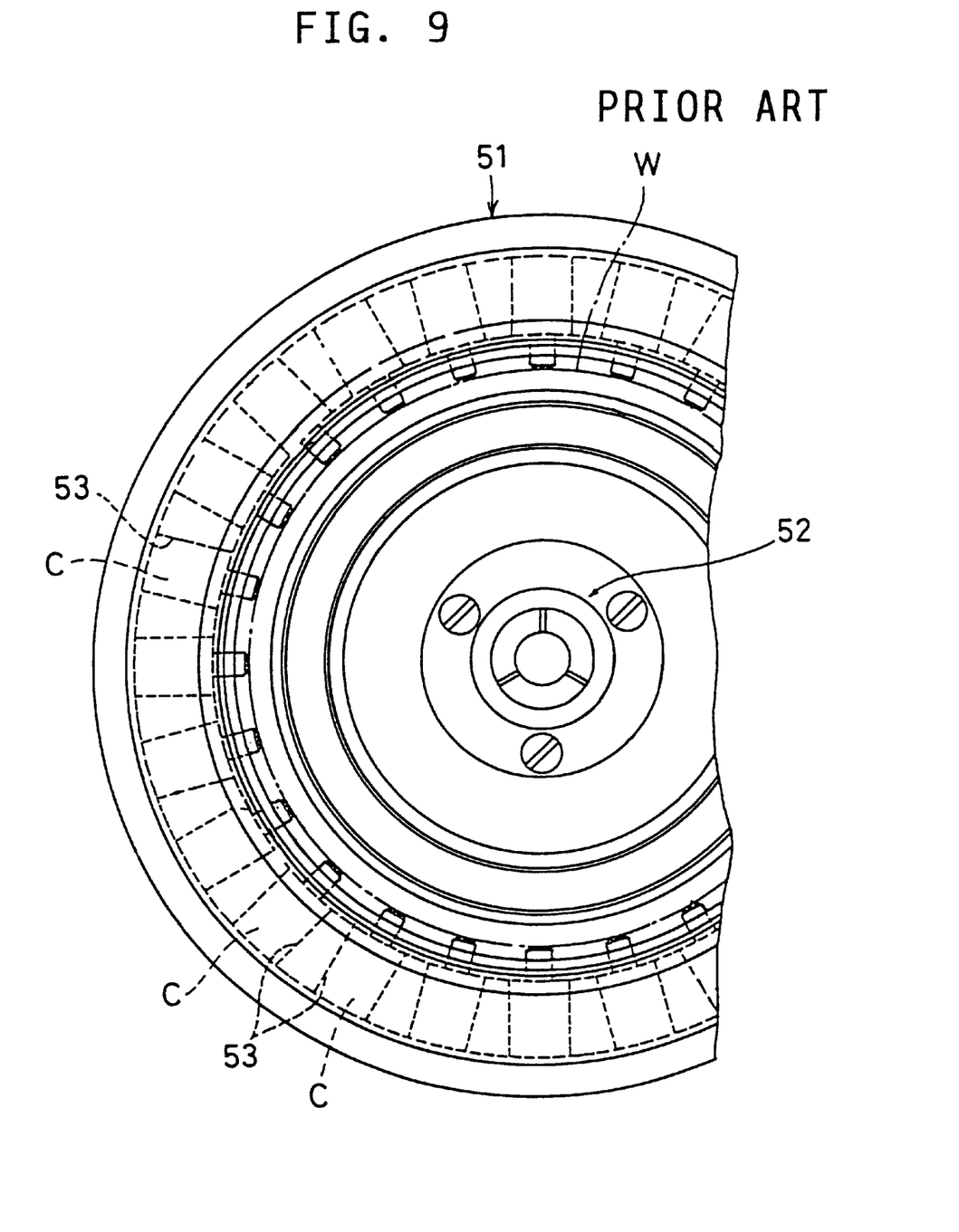
FIG. 9 is a front view of the same.

FIGS. 8 and 9 show such a chuck assembly, which includes a tubular chuck body 51 concentrically mounted on a lathe main spindle, and a collet chuck 52 concentrically mounted on the chuck body 51 for gripping a centering reference portion of a workpiece W. The chuck body 51 is formed with a plurality of small cylindrical holes 53 arranged on a plane perpendicular to the axis of the chuck body at equal angular intervals with their axes extending radially of the chuck body. A piston P is slidably received in each cylindrical hole 53 to form a cylinder.

Oil is supplied into the cylinders C through oil passages 54 formed in the chuck body 51 to protrude rods L from the inner periphery of the chuck body 51 by pushing the pistons P. When oil pressure is released, the rods L are retracted by unillustrated springs mounted in the pistons P.

To chuck a workpiece with this chuck assembly, the workpiece W is put on the inner surface of the chuck body 51, and its centering reference portion is chucked by the collet chuck 52 to center the workpiece. In this state, the workpiece W is chucked by pressing the rods L of the cylinders C against the outer surface of the workpiece W.

This conventional chuck assembly chucks the workpiece with a plurality of cylinders C arranged at equal angular intervals along the circumference concentric with the main spindle. If the workpiece is a thin, brittle member, weak oil pressure is applied to the cylinders C. Thus, if there is even slight roughness on the surface of the workpiece, the pistons tend to move to different degrees from each other. Thus, this device has no self-centering function.

In this arrangement, a workpiece has to be centered by chucking its centering reference portion with the collet chuck 52 before being chucked by the plurality of cylinders C. Thus, for workpieces having different centering reference portions, different collet chucks are needed. That is, different chucks are needed for different kinds of workpieces W.

When a guide is used to center a workpiece, not so accurate centering is needed for rough machining because in rough machining, the machining depth is large. But for finish machining, if a large clearance for inserting the guide is provided to cope with various kinds of workpieces, the clearance tends to be too large if the workpiece is small. Too large a clearance makes it difficult to center the workpiece with high accuracy.

An object of this invention is to provide a chuck device which is simple in structure and can accurately and rigidly chuck various kinds of thin and brittle workpieces.

SUMMARY OF THE INVENTION

According to this invention, there is provided a chuck assembly comprising a tubular chuck body concentrically fixed to a main spindle of a machine tool, three first cylinders and a plurality of second cylinders provided in the chuck body, the first and second cylinders being arranged along a circumference in a plane perpendicular to the spindle at equal angular intervals, pistons mounted in the first and second cylinders and adapted to radially protrude under fluid pressure and retract under the force of springs or under fluid pressure, the first cylinders being arranged at equal angular intervals and, each of the first and second cylinders having a rod adapted to protrude and retract from a cylindrical surface of the chuck body, the first and second cylinders communicating with a pressure fluid source through a pressure fluid supply passage provided in the chuck body, whereby a workpiece is chucked by applying the pressure fluid from the pressure fluid source to the pistons, and a pressure-biasing means for applying pressure to the pistons of the first cylinders against the workpiece independently of the fluid pressure from the pressure fluid source.

In this arrangement, a workpiece is set in the chuck body. Then, the first and second cylinders are actuated to chuck the workpiece. In this state, pressure is applied from the pressure biasing means to the pistons of the first cylinders, so that these pistons are less likely to be retracted by the reaction force from the workpiece. Thus, although weak fluid pressure is applied to the pistons of the first and second cylinders to chuck the workpiece, the pressure biasing means imparts additional pressure to the first cylinders so that the first cylinders are less likely to retract. Thus, the first cylinders have a self-centering function.

A workpiece is thus lathed while being centered by the first cylinders and chucked by both the first and second cylinders. After lathing, the workpiece is removed by disengaging all the cylinders.

The pistons of the first and second cylinders may be retracted by the biassing force of springs or under fluid pressure. With the double-acting arrangement, when the pistons are advanced, they are biased only by the fluid pressure with no spring force applied. In the single-acting arrangement, which needs springs, it is difficult to bias all the pistons uniformly because the springs for biasing the pistons inevitably vary in length, diameter and the number of turns. The double-acting arrangement, in which oil pressure is used to retract the pistons, is free of this problem.

According to the invention, each of the pistons may have at its tip a detachable extension, the chuck assembly further comprising a ring adapted to fit in the cylindrical surface of the chuck body, the ring having holes through which the extensions of the pistons slide so as to protrude and retract from the surface of the ring. This device can chuck workpieces having widely different diameters without changing the chuck body.

Other features and objects of the present invention will become apparent from the following description made with reference to the accompanying drawings, in which:

DETAILED DESCRIPTION OF THE PREFERRED EMBODIMENT

The embodiments of FIGS. 1–7 are now described. The terms "front" and "rear" used in the following description refer to the side axially away from the lathe spindle and the side axially toward the lathe spindle, respectively.

[First Embodiment]

Figure 1:
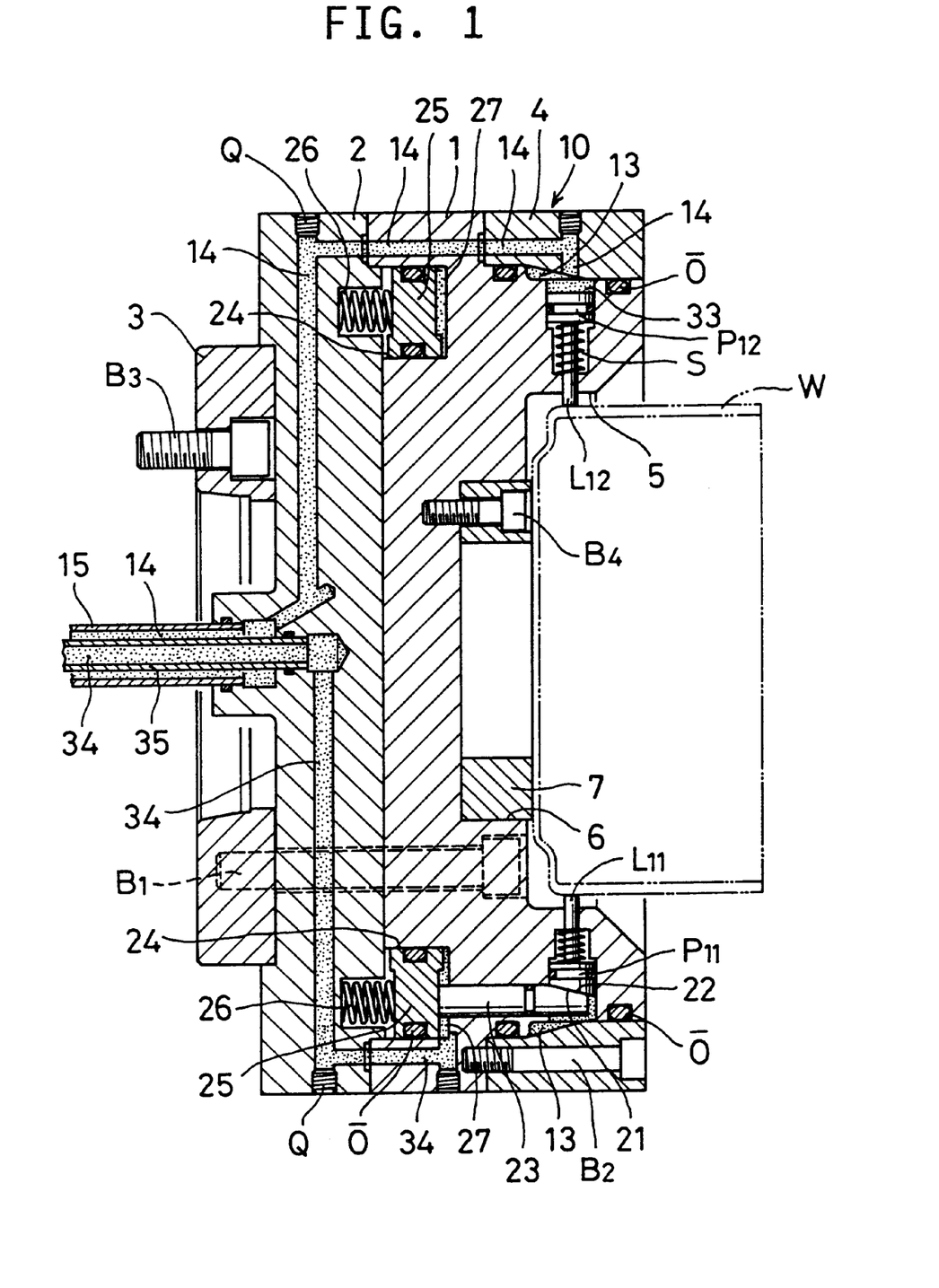
FIG. 1 is a vertical sectional view of one embodiment.

In the embodiment of FIG. 1, numeral 1 is a columnar housing 1. A disk-shaped back plate 2 is coaxially mounted on the back of the housing 1. An adapter plate 3 is coaxially mounted on the back of the back plate 2. These three parts are joined together by bolts B1. A cylindrical balance ring 4 is mounted on a front shoulder portion of the housing 1 and is secured to the housing by bolts B2. These four members constitute a chuck body 10. The adapter plate 3 of the chuck body 10 is concentrically mounted on the end face of a main spindle of an unillustrated lathe by bolts B3.

In its front end face, the housing 1 is formed with a hole 5 concentric with the lathe spindle. A workpiece W is temporarily set in the hole 5 to chuck it. Along its outer edge, the hole 5 is tapered so that a workpiece can be smoothly inserted into the hole 5. A hole 6 smaller in diameter than the hole 5 is coaxially formed in the bottom of the hole 5. A workpiece stopper ring 7 is inserted in the hole 6 and secured to the housing 1 by bolts B4.

Figure 2:
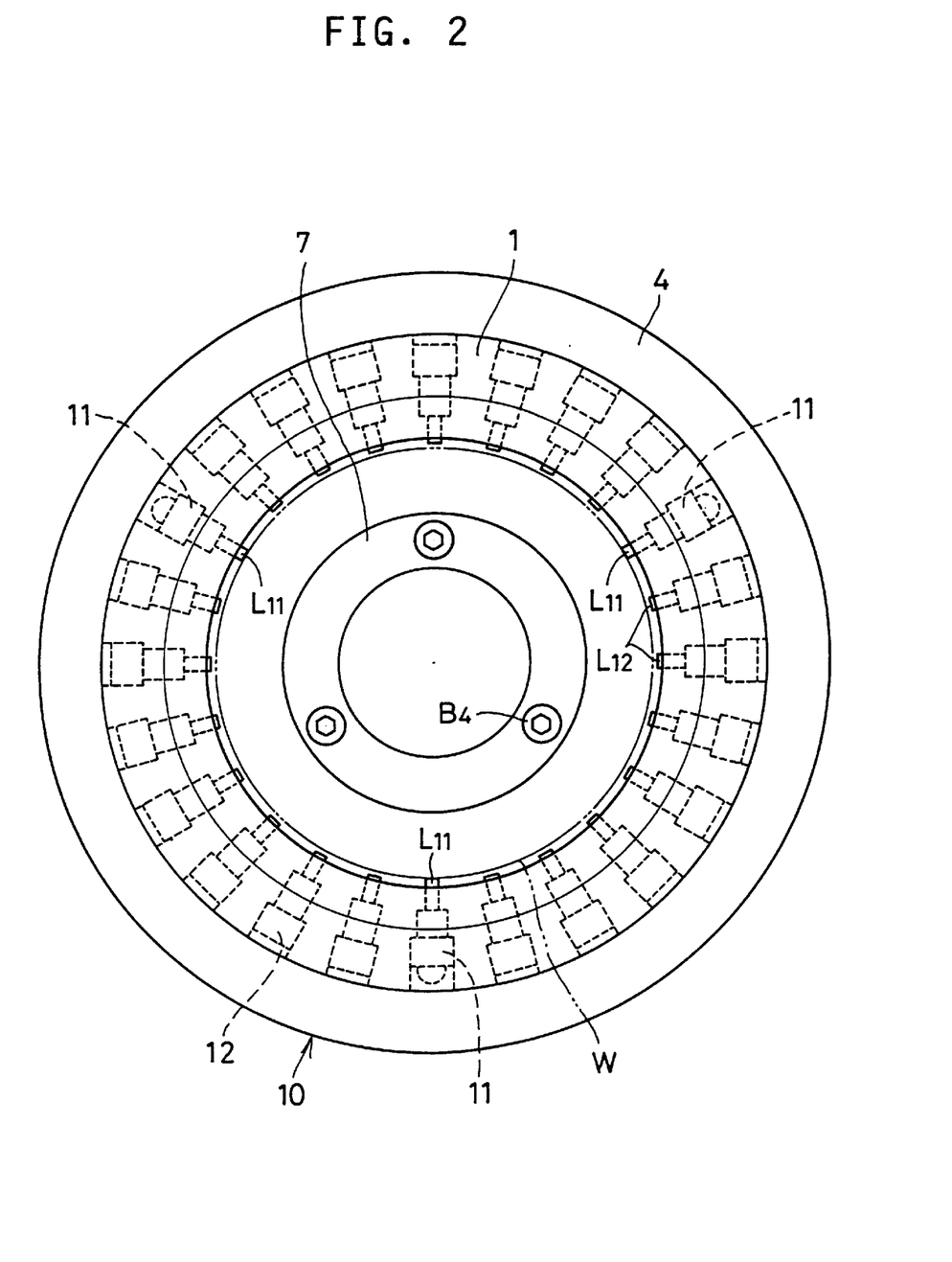
FIG. 2 is a front view of the same.

As shown in FIGS. 1 and 2, the housing 1 has three cylinders 11 and 21 cylinders 12, a total of 24 cylinders, arranged on a single plane perpendicular to the axis of the lathe main spindle at equal angular intervals of 15°. The three cylinders 11 are arranged at 120° equal angular intervals. Each cylinder 11, 12 comprises a cylindrical hole formed in the housing 1 to extend in a radial direction of the lathe spindle, a piston P11, P12 slidably inserted in the hole, and a rod L11, L12 integral with the piston P11, P12. In the following description, the three cylinders 11 are referred to as first cylinders, while 21 cylinders 12 are referred to as second cylinders 12.

The rods L11, L12 of the cylinders 11, 12 are adapted to protrude a predetermined length from the hole 5 formed in the housing 1 when oil pressure is applied to the pistons P11, P12. The cylinders 11, 12 are single-acting cylinders in that the rods and pistons are advanced by oil pressure and retracted by springs S mounted in the cylinders 11, 12.

Oil from an unillustrated oil pressure source is introduced into the cylinders 11, 12 through an oil passage 14 to apply oil pressure on the back of the pistons P11, P12. As shown, the oil passage 14 comprises a gap 13 defined between the balance ring 4 and the housing 1 and communicating with the rear portions 33 of the cylinders 11, 12; first channels formed in the balance ring 4 radially outside of the respective cylinders 12 so as to extend substantially parallel to and toward the lathe spindle from the gap 13 to the interface between the balance ring 4 and the housing 1; second channels communicating with the respective first channels and extending through the housing 1 to the interface between the housing 1 and the back plate 2; and third channels communicating with the respective second channels and extending radially through the back plate 2 to its center, where they are connected to an oil supply pipe 15 leading to the oil pressure source.

The piston P11 of each first cylinder 11 has its rear surface 21 inclined with respect to its axis. Rods 23 are slidably mounted in the housing 1 parallel to the lathe spindle. Each rod 23 has a rear inclined surface 22 adapted to abut the rear inclined surfaces 21 of the respective piston P11. At their other ends, the rods 23 are biased by compression springs 26 through a ring-shaped piston 25 received in an annular groove 24 formed in the rear part of the housing 1. The inclined surfaces 22 of the rods 23 are thus normally pressed against the inclined surfaces 21 of the pistons P11, so that the pistons P11 are biased radially inwardly of the lathe spindle by the springs 26.

Leading to the front end of the piston 25 is an oil passage 34 extending through the housing 1 and the back plate 2 and connecting with a second oil supply pipe 35 extending through the oil supply pipe 15 to the oil pressure source. In the figures, the letter O indicates an O-ring, and Q valve screw which cover drain holes through which air vents and oil passages 14 and 34 are accessible for cleaning.

The operation of the chuck assembly of this embodiment is now described.

Oil is supplied into the oil passage 34 through the oil supply pipe 35 by activating an unillustrated hydraulic circuit to retract the rods 23 against the bias of the springs 26. In this state, no oil is supplied into the oil passage 14 through the pipe 15 so as not to apply oil pressure to any of the cylinders 11, 12. The pistons P11, P12 are thus retracted to the limit. In this state, a workpiece W is inserted into the hole 5 of the housing 1 until it is pressed against the workpiece stopper 7.

Then, the hydraulic circuit stops the supply of oil to the oil passage 34 through the pipe 35. Now the rods 23 are advanced (moved rightwardly in FIGS. 1 and 3) under the biasing force of the springs 26 transmitted through the piston 25 to center the workpiece W. In this state, oil is supplied into the oil passage 14 leading to both first and second cylinders 11, 12 to protrude the pistons P11, P12 of the first and second cylinders 11, 12.

Figure 3:
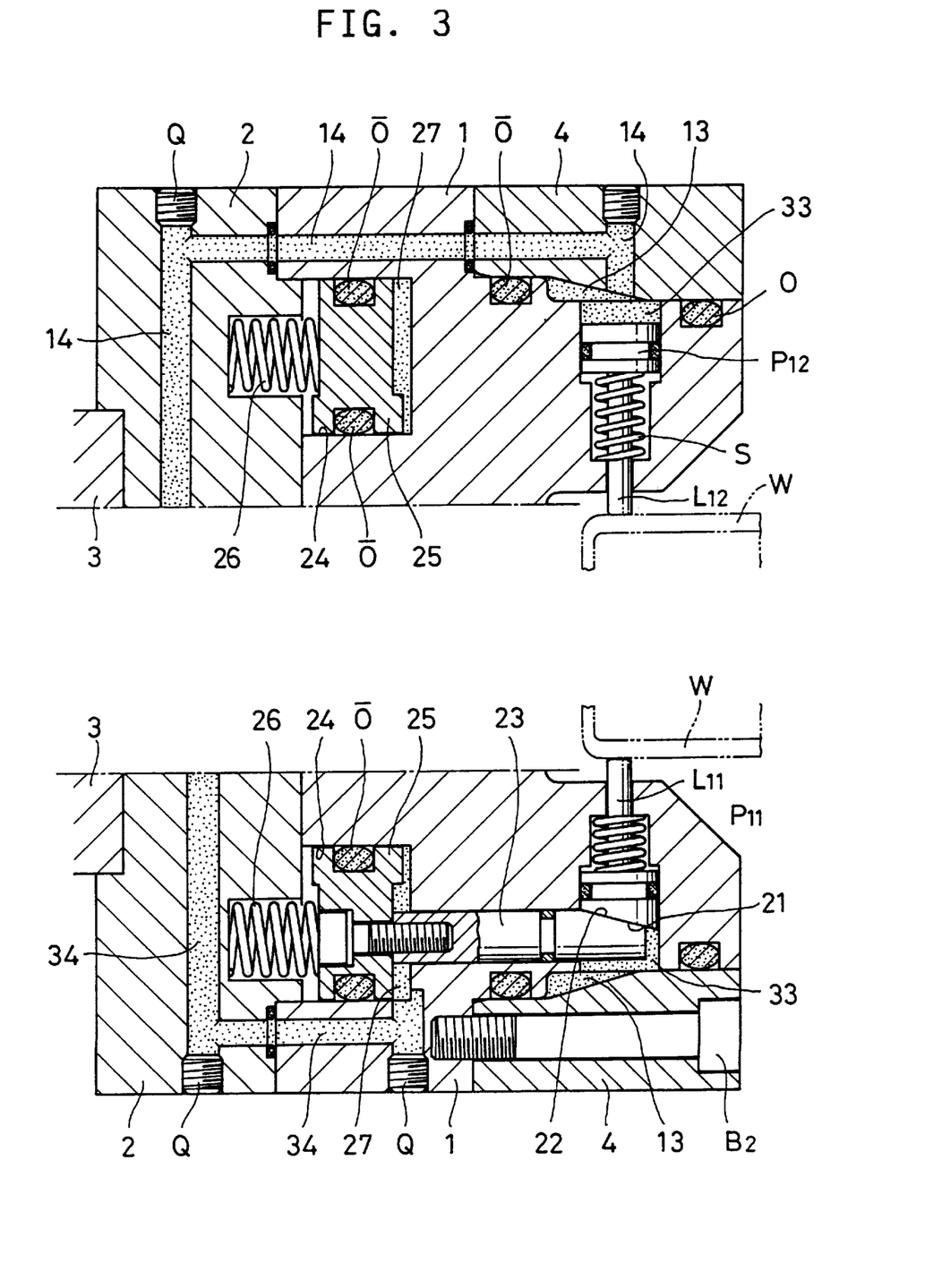
FIG. 3 is a partial sectional view of the same.

Oil pressure applied to the pistons P11, P12 through the passage 14 is so weak for thin and brittle workpieces that if the workpiece W has eccentricity or roughness on the surface, the pistons P12 of the cylinders 12 are moved to different degrees from each other. But the pistons P11 of the cylinders 11 are acted on not only by the weak oil pressure applied through the passage 14 but also by the biasing force of the springs 26 through the piston 25 and the rods 23 because the inclined surfaces 21 of the pistons P11 are pressed against the inclined surfaces 22 of the rods 23. The pistons P11 are thus less likely to be retracted by the reaction force from the workpiece 2 than the pistons P12 when the workpiece is chucked.

Thus, the pistons P11 of the first cylinder perform a self-centering function by binding the workpiece W. That is, the workpiece W is centered by the first cylinders 11. The second cylinders 12 give an additional chucking torque.

The chucking force of the first cylinders 11 is adjustable by varying the pressure of oil supplied through the second oil supply pipe 35 and the oil passage 34 into a space 27 defined by the end face of the piston 25 in contact with the rods 23 and the annular groove 23. That is, by reducing the oil pressure in the space 27, the compression springs 26 expand, so that the pistons P11 are pressed harder against the workpiece. By increasing the oil pressure in the space 27, the springs 26 are compressed, so that the chucking force of the pistons P11 decreases.

With the workpiece W centered and chucked by the first and second cylinders so that the workpiece W will not be deformed even if it is a thin member, its inner surface is worked by the lathe.

After lathing, the hydraulic circuit is activated to discharge oil in the oil passages 14, 34. The pistons P11, P12 are thus retracted by the springs S, disengaging the workpiece W. The workpiece is then removed.

[Second Embodiment]

The cylinders 11, 12 of the second embodiments are double-acting cylinders in that oil pressure is utilized to both protrude and retract the pistons P11, P12.

In this double-acting arrangement, instead of the springs S of FIG. 1, an unillustrated oil passage for retracting the pistons P11, P12 is formed parallel to the oil passage 14 of FIG. 1. The piston-retracting oil passage communicates at one end thereof with the front ends of the cylinders 11, 12 and at the other end with an oil pressure source through e.g. a 4-port, 2-position changeover valve. In this arrangement, when the valve is changed over so that the piston-retracting oil passage opens into an oil tank or the atmosphere with the oil passage 14 communicating with the oil pressure source, the pistons protrude. When the valve is changed over to connect the piston-retracting oil passage to the oil pressure source with the oil passage 14 communicating with an oil tank or the atmosphere, oil flow is reversed and the pistons P11, P12 retract. Otherwise, this embodiment has nothing different both structurally and functionally from the first embodiment.

The double-acting arrangement is advantageous in that the pistons P11 and P12 are more uniformly biased by oil pressure than by the springs S. In the single-acting arrangement, in which the springs S are used to retract the pistons, while a workpiece is being chucked by the pistons, the pistons are biased by the individual springs S. The springs S inevitably vary in length, diameter and the number of turns. Thus, different biasing forces tend to act on the respective pistons, making it difficult for the pistons to uniformly grip the workpiece. This increases the possibility of the workpiece being warped. The double-acting arrangement, in which oil pressure is used to retract the pistons, is free of this problem.

[Third Embodiment]

Figure 4A:
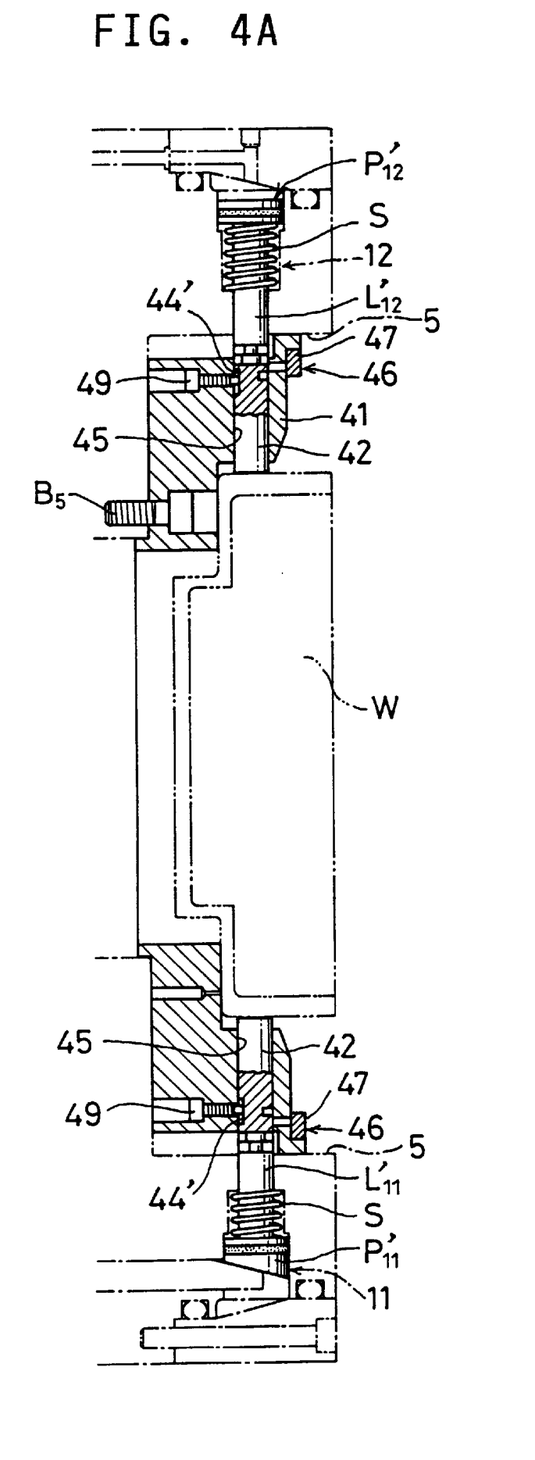
FIG. 4A is a vertical sectional view of a third embodiment.

The third embodiment is a modification of the first and second embodiments. The chuck assembly of this embodiment can grip thin and brittle workpieces having widely different diameters. In FIG. 4, which shows the third embodiment, portions common to the first embodiment are simply outlined and enclosed in chain lines.

The device shown in FIG. 4A has a second ring 41 received in the hole 5 of the housing 1. Each piston P11', P12' has an extension 42.

Figure 4B:
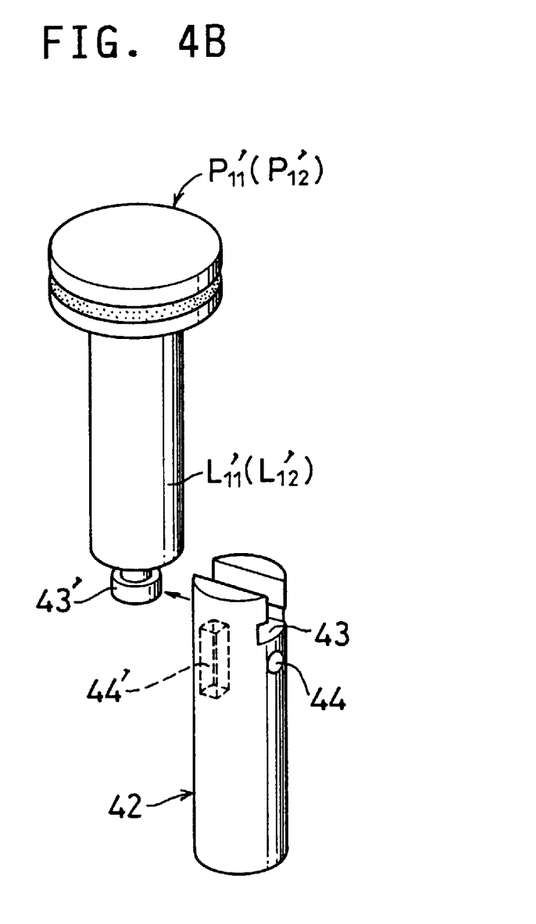
FIG. 4B is a perspective view of a piston and an extension to be coupled to the piston.

As shown in FIG. 4B, each rod L11', L12' of the pistons P11', P12' has a small-diameter head 43' having a sectional shape of the letter T. The extensions 42 are cylindrical members having the same diameter as the pistons P11', P12' and each has a T-shaped groove 43 extending diametrically across its cylindrical end face and axially to a predetermined depth. By engaging the small-diameter heads 43' in the respective T-shaped grooves 43, the extensions 42 are connected to the respective pistons P11', P12'. A pin hole 44 is formed in each extension 42 near the T-groove 43 for the purpose to be described hereinbelow. For the purpose to be described hereinbelow, a cutout 44' having a rectangular section and a predetermined depth is formed in the periphery of the extension 42.

The second ring 41 has a flange that fits snugly in the inner wall of the housing 1. Radial through holes 45 are formed in the second ring 41 so as to align with the respective pistons P11', P12' when the ring 41 is set in the hole 5 of the housing 1. With the ring 41 set in the hole 5, the extensions 42 of the pistons P11', P12' can protrude and retract from the inner periphery of the ring 41 by sliding in the respective radial holes 45.

Figure 5:
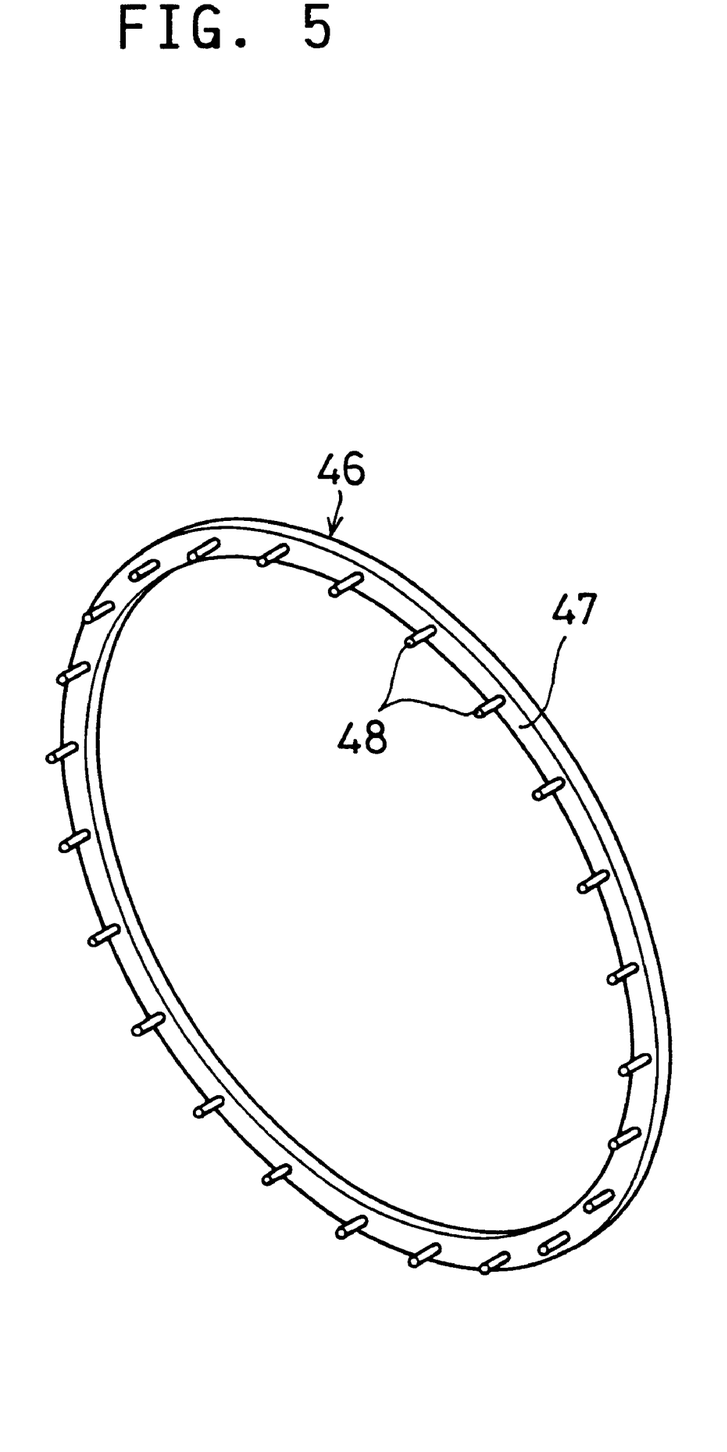
FIG. 5 is a perspective view of a jig for mounting extension members.

In this embodiment, a jig 46 shown in FIG. 5 is used to mount the extensions 42 to the pistons P11', P12' and to insert them into the holes 45 of the second ring 41. The jig 46 is a ring 47 formed from a thin plate and provided with a plurality of vertical pins 48 arranged at the same angular intervals as the cylinders 11, 12. The pins 48 have a small enough diameter so as to fit loosely in the pin holes 44 formed in the extensions 42. Description is now made on how the extensions 42 are mounted with reference to FIGS. 6 and 7.

Figure 6:
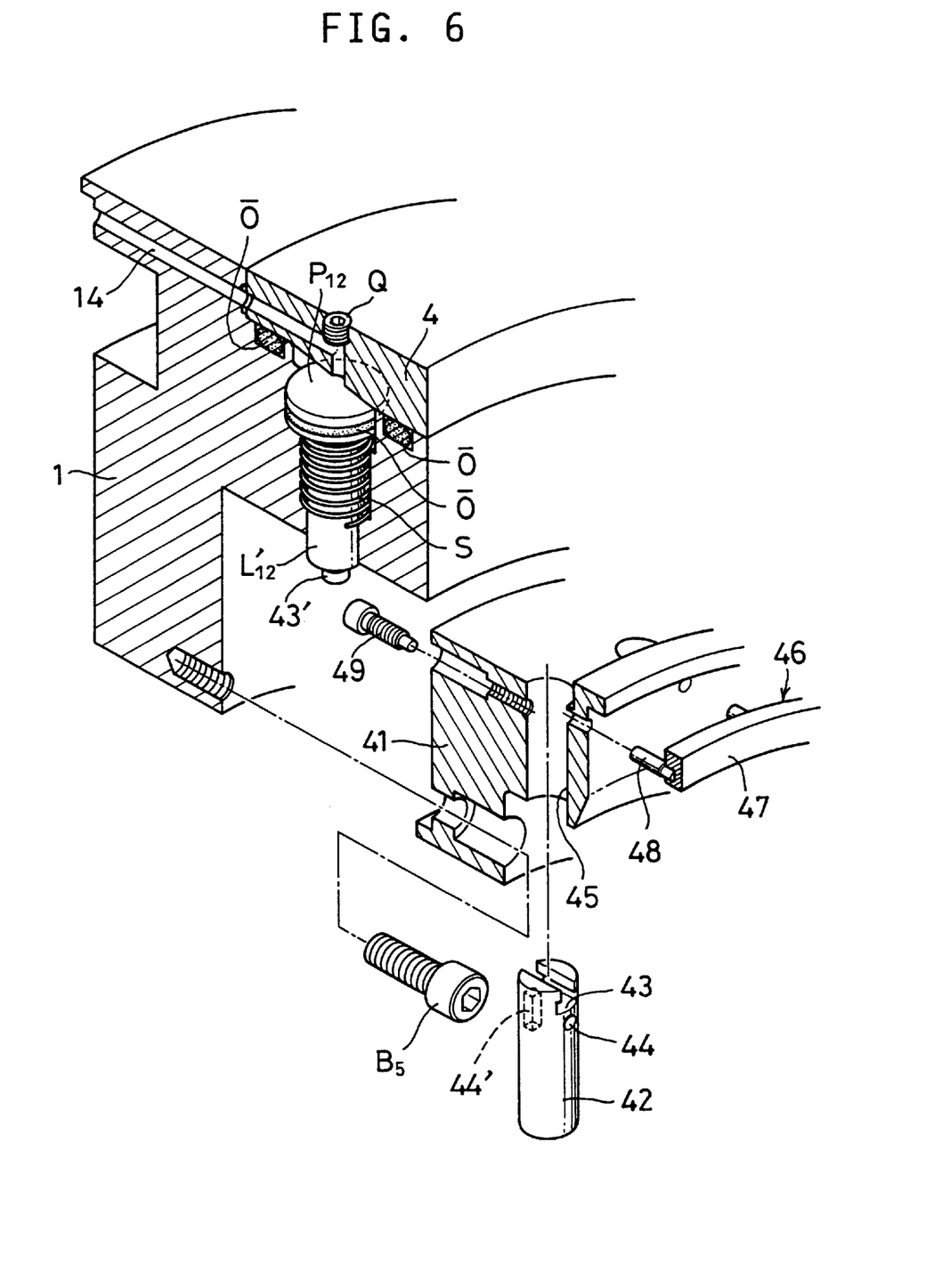
FIG. 6 is a perspective view showing how extension members and a second ring are mounted.
Figure 7:
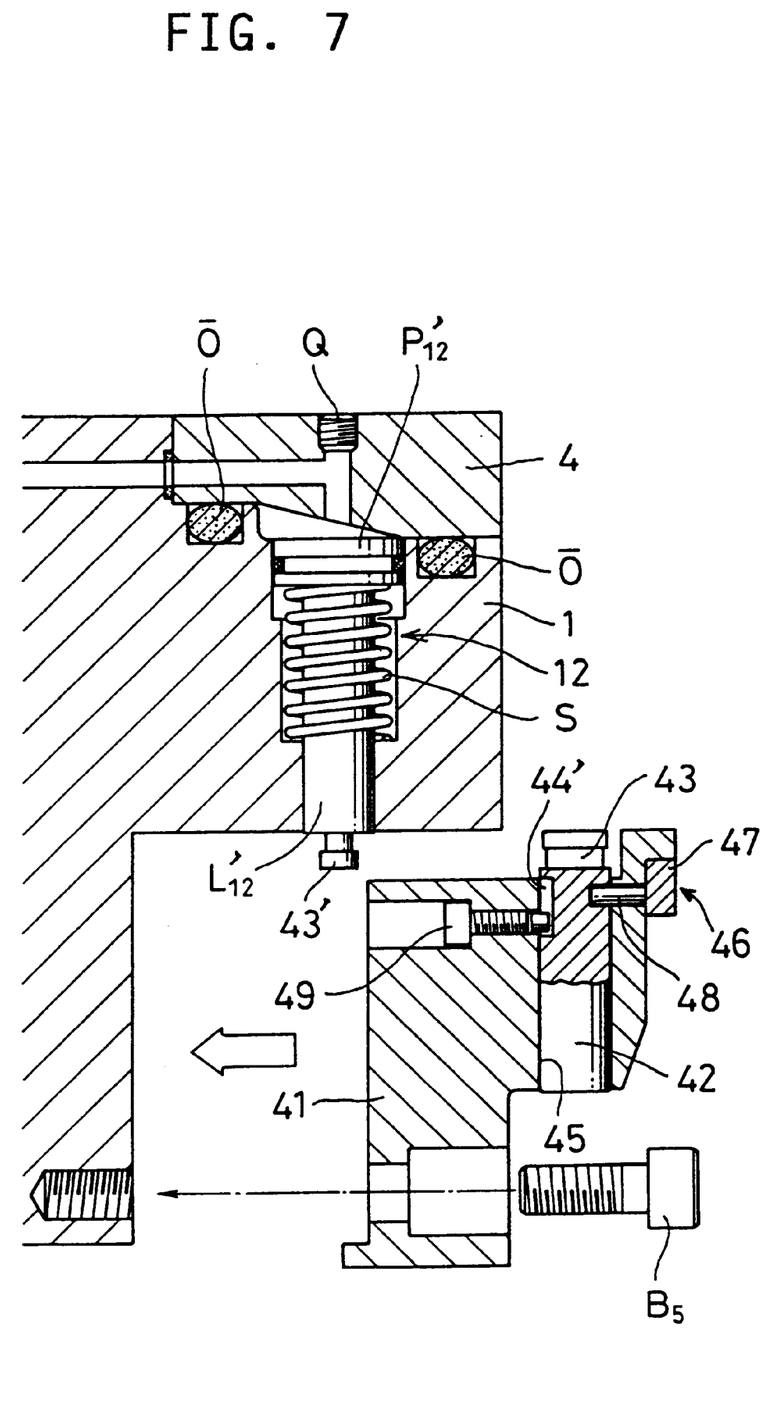
FIG. 7 is a vertical sectional view showing how extension members and a second ring are mounted.

First, oil pressure is released to retract all the pistons P11', P12'. In this state, the extensions 42 are inserted into the holes 45 of the second ring 41. Then, lock bolts 49 are threaded into the ring 41 from one side thereof until their tips get into the cutouts 44' formed in the extensions 42. The extensions 42 are thus prevented from turning. With the bolts 49 received in the cutouts 44', the pin holes 44 formed in the extensions 42 near the T-grooves 43 are arranged parallel to the lathe spindle.

In this state, the jig 46 is fitted in the second ring 41 to engage the pins 48 in the pin holes 44 of the respective extensions 42, thus preventing radial movement of the extensions 42 in the second ring. The second ring 41 thus assembled is then inserted into the hole 5 of the housing 1. While the ring 41 is being inserted into the hole 5, the small-diameter heads 43' of the rods L11', L12' of the pistons P11', P12', which are now protruding from the inner periphery of the housing 1 because no oil pressure is applied, engage in the T-grooves 43 of the extensions 42. When the ring 41 fits completely in the hole 5, the ring 41 is fixed to the housing 1 by bolts B5. The jig 46 is then removed.

The ring 41 is thus mounted in position with the extensions 42 coupled to the pistons P11', P12'. By mounting the ring 41, it is possible to chuck a thin and brittle workpiece W having a smaller diameter than a workpiece W set in the hole 5 with no second ring 41 set therein. With this arrangement, by preparing second rings 41 with different diameters and provided with extensions 42 having different lengths, and jigs 46 corresponding to the respective rings and extensions, it is possible to chuck workpieces w having widely different diameters without exchanging the chuck body 10.

The devices of the embodiments are used to chuck the outer edge of a workpiece W. But by arranging the cylinders 11, 12 so that the rods L protrude radially outwardly, it is possible to chuck the inner edge of a workpiece W.

As described, the chuck assembly according to this invention is simple in structure because it needs no chuck claws for centering workpieces. Still, this chuck assembly can center and chuck different kinds of thin and brittle workpieces with high accuracy and reliability.

What is claimed is:

1. A chuck assembly comprising a tubular chuck body concentrically fixed to a main spindle of a machine tool, three first cylinders and a plurality of second cylinders provided in said chuck body, said first and second cylinders being arranged along a circumference in a plane perpendicular to said spindle at equal angular intervals, pistons mounted in said first and second cylinders and adapted to radially protrude under fluid pressure and retract under the force of springs or under fluid pressure, said first cylinders being arranged at equal angular intervals and, each of said first and second cylinders having a rod adapted to protrude and retract from a cylindrical surface of said chuck body, said first and second cylinders communicating with a pressure fluid source through a pressure fluid supply passage provided in said chuck body, whereby a workpiece is chucked by applying the pressure fluid from the pressure fluid source to said pistons, and a pressure-biasing means for applying pressure to the pistons of said first cylinders against the workpiece independently of the fluid pressure from said pressure fluid source.

2. A chuck assembly as claimed in claim 1 wherein said first and second cylinders are double-acting cylinders in which the pistons of said first and second cylinders are advanced and retracted under fluid pressure.

3. A chuck assembly as claimed in claim 1 wherein each of said pistons has at its tip a detachable extension, said chuck assembly further comprising a ring adapted to fit in said cylindrical inner surface of said chuck body, said ring having holes through which said extensions of said pistons slide so as to protrude and retract from inner surface of said ring.

4. A chuck assembly as claimed in claim 2 wherein each of said pistons has at its tip a detachable extension, said chuck assembly further comprising a ring adapted to fit in said cylindrical inner surface of said chuck body, said ring having holes through which said extensions of said pistons slide so as to protrude and retract from inner surface of said ring.

\* \* \* \* \*